United States Patent Office 3,511,570
Patented May 12, 1970

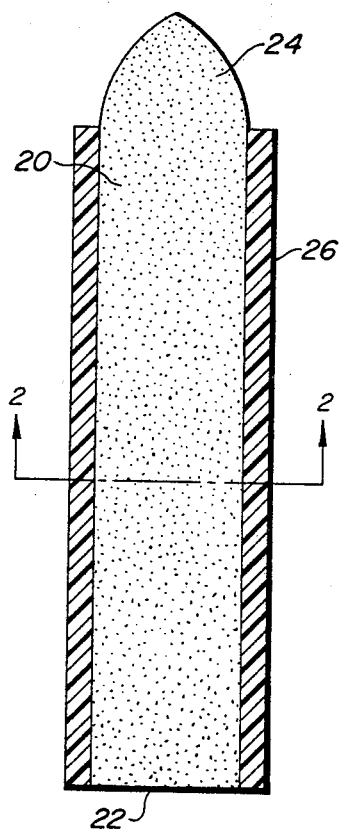
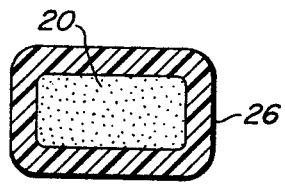

3,511,570
METHOD OF PREPARING SAMPLES FROM SOLUTION
John W. Mogayzel, North Arlington, Va., and Norman Adler, Arlington, Mass., assignors to Arthur D. Little, Inc., Cambridge, Mass., a corporation of Massachusetts
Original application May 26, 1966, Ser. No. 553,208, now Patent No. 3,452,601, dated July 1, 1969. Divided and this application Apr. 7, 1969, Ser. No. 813,897
Int. Cl. B01d *43/00;* G01n *1/00*
U.S. Cl. 356—36                            3 Claims

ABSTRACT OF THE DISCLOSURE

Method of preparing samples from solution for analysis by selective absorption of radiation comprising contacting a body of said solution with one end of a porous mass of a material convertible into an imporous mass, transferring said solution to the opposite end of said mass and evaporating the solvent of the solution at the opposite end.

---

This invention is a division of copending application Ser. No. 553,208 filed May 26, 1966 now U.S. Pat. No. 3,452,601.

This invention relates to spectroscopy and more particularly to method of and means for sample preparation particularly in infrared spectroscopy.

Spectral absorption examination of solids has been accomplished by a number of techniques such as the use of solutions, mulls, dry powder films and pressure-fused discs. Solution techniques involve the use of a suitable solvent with wide band pass characteristics in the pertinent infrared region and with relatively high solubility for the solid to be examined. Mull techniques are useful if the absorption bands of the mulling agent do not interfere with the absorption bands of the solid, and if reflection losses can be tolerated. Very small particle sizes are required for dry powder films to avoid scattering, particularly of infrared radiation.

Fused disc techniques have been widely used for both qualitative and quantitative work because they present fewer problems. Typically, the solid material, frequently as a tiny quantity, is diluted by admixture with purely ground matrix powder of, for example KBr, and pressing the mixture to a fused disc which can be introduced into the light beam of a spectrophotometer. A number of different matrix materials have been used, all of which are capable of being compressed from a finely powdered state into homogeneous plates or discs substantially transparent to the radiation region of interest. Typically, alkali halides such as KBr, KI, KCl, NaBr, NaI, NaCl, and CsBr have been used. Other materials as diverse as AgBr and polyethylene have also been used as matrices. Since KBr of high purity is transparent in the ultraviolet as well as the infrared (as far in the latter as 28 microns for KBr), it is the most widely used material.

Heretofore, the matrix material is usually finely ground and intimately mixed with the sample as by grinding the first mixture in a mill, the concentration of sample in the matrix material usually being below 0.5%. The final mix is pressed, for example at 25,000 p.s.i., in a die to form an imporous, transparently clear disc.

This latter technique possesses a number of other shortcomings. For example, homogeneity of sample and matrix is frequently obtained by prolonged grinding of the mix, but this can produce polymorphic changes in the sample structure, and sometimes cause the sample to become hydrated or changed into a salt, giving rise to undesired spectral anomalies.

The above technique pre-supposes the availability of sufficient sample to permit ready admixture with matrix material, and thereby to obtain a disc with suitable sample concentration. However, when only a dilute solution of a minute quantity of a sample is available, as is often the case when the samples are obtained as the result of chromatographic, electrophoretic or other micro analytical separation and purification processes, conventional transfer operations employed to obtain a sufficiently high level of concentration without either recontaminating or losing the sample are often very difficult or ineffective. For example, silica gel is typically employed as a selective adsorbent in chromatographic separations. However, silica gel displays undesirable infrared properties and has to be removed from the sample in order to allow the infrared spectrum of the latter to be determined without interference. The removal of all of the silica gel by conventional filtration techniques is an extremely difficult process because some of the silica is possibly present as a colloidal suspension rather than as a conventionally filterable solid.

The present invention involves techniques and devices useful in solid phase absorption spectroscopy which considerably simplify the preparation of pellets or discs including micro samples, and which overcome a number of the foregoing problems. A principal object of the present invention is to provide a novel structure for use in transferring micro samples into a matrix subsequently suitable for absorption spectroscopy, which structure comprises an elongated element of matrix material formed as a porous stratum capable of transporting by capillarity from one end to the other of the element a solvent containing the sample as a solute. Other important objects of the present invention are to provide a means for concentrating the solute in a limited amount of matrix material without any loss of solute; to provide a means for eliminating various contaminants, such as solid materials or silica gel residues obtained from analytical separations; and to provide a method of using such an element so as to simplify and improve the technique of forming discs for examination of the absorption spectrum of a sample material.

These and other objects of the invention will in part be obvious and will in part appear hereinafter. The invention accordingly comprises the apparatus possessing the construction, combination of elements, and arrangement of parts and the several steps and the relation of one or more of such steps with respect to each of others all of which are exemplified in the following detailed disclosure and the scope of the application of which will be indicated in the claims.

For a fuller understanding of the nature and objects of the present invention, reference should be had to the following detailed description taken in connection with the accompanying drawings wherein:

FIG. 1 is a sectional view of an embodiment of the invention taken across its axis of elongation; and FIG. 2 is a sectional view taken along the line 2—2 of the embodiment of FIG. 1, i.e. across the axis of elongation.

As shown in FIGS. 1 and 2, a preferred embodiment of the present invention comprises an elongated element 20. Element 20 is formed of a matrix material meeting a number of criteria. It must be capable of being compressed to form a porous mass wherein the pores are interconnected to form channels of size appropriate to allow capillary flow through the mass of a solvent and a solute sample. It further must be a solid capable of being compressed, as from a powdered state, into an imporous mass or disc that is substantially transparent to the radiation of interest, e.g. does not, in the compressed transparent form, exhibit substantial absorption of radiation, such as infrared, in the band of radiation intended for use in identifying the sample material to be mixed with the matrix material.

Of course, the matrix material should be relatively highly insoluble with respect to the solvent to be transported therethrough when the material is in porous form and should be substantially nonreactive chemically with either the solvent or the solute.

These criteria are readily met by the usual solid state matrix materials noted above, if one is judicious in the selection of the solvents and solutes with which element 20 is employed as will be more fully described hereinafter.

In a preferred configuration, element 20 is simply a cylindrical rod, one end 22 of which is flat, the other end 24 being conically tapered down. Element 20, except for ends 22 and 24, is completely enclosed in a shield or coat 26 shown in intimate contact with element 20. However, it will be appreciated that coat 26 can also be loosely fitted to element 20, if desired. Coat 26 is an imporous material, i.e. impermeable to the solvent with which element 20 is to be used. Typically coat 26 is glass, polytetrafluorethylene, polyvinylchloride or the like, or can even be an imporous coat of the same matrix material.

Ordinarily the section configuration (as shown in FIG. 2) across the axis of elongation is not important, and can be circular, polygonal, oval, rectangular or the like, and need not be uniform.

The structure of FIG. 1 could be manufactured in a number of ways. For example, coat 26 could be a glass tube. The latter is then filled, for example with KBr powder (such as a spectroscopic grade available from Harshaw Chemical Co., Cleveland, Ohio) and the tube placed into a die. The powder is compressed by a hydraulic plunger for 1 second at, for example, 8000 p.s.i. to form a KBr mass having dimensional rigidity and requisite porosity. The glass tube, if necessary, can be trimmed to expose the ends of the KBr mass and one of the latter can be shaped to a cone if desired. However, this method may result in non-uniform porosity of the KBr mass.

Thus, in a preferred method where uniform porosity is desired, an elongated rectangular female die is filled with KBr powder and a male flat placed thereon. This is then compressed at a pressure sufficient to form a substantially rigid but porous element of KBr. The KBr element is removed from the die and a sleeve of imporous polyethylene or other appropriate plastic sheet wrapped around the element and then sealed, the sleeve leaving the ends of the element exposed.

In the preferred usage, only end 22 of the device of the present invention is placed in contact with a solution containing the dissolved sample of material, the absorption spectrum of which is to be determined. If the solution is aqueous, the matrix material of the invention is preferably water-insoluble and typically can be AgBr, polyethylene or the like. For use with non-aqueous solvents, KBr is preferred as the matrix material. The porous matrix acts as a wick and therefore by capillary action transfers the solutions to the other end 24 of the elongated element. Coat 26 serves to prevent solvent evaporation from the surface of element 20 except at end 24. As solvent evaporates from exposed end 24, the concentration of the solute sample in the exposed end increases. Of course, the length of time one continues to wick solution through element 20 depends on a number of factors such as solvent volatility in the ambient atmosphere, temperature, the original concentration of solute in the solvent and the like. If desired, particularly where only a minute quantity of the solute is available, additional solvent can be added from time to time to the original solute container to aid transport of all of the solute to the exposed end of the element. When it is determined that an appropriate solute concentration has been achieved adjacent end 24, the latter is simply broken or cut away from the body of element 20. The broken tip end is then preferably allowed to dry.

The broken tip with its dried sample can then be pressed sufficiently to render the matrix material transparent. However, where it is desired to achieve homogeneity of matrix and sample material, the broken tip need only be crushed and the resulting debris mixed. Because of its porous structure, the tip tends to return to powder form readily with a minimum of undesirably prolonged grinding. The crushed tip need only be compressed in the usual manner in a die, for example at 15,000 lbs. pressure for 20 minutes, to form the desired transparent pellet ready for spectroscopic examination. The actual time of compression depends, inter alia, on pellet dimensions, moisture content and the like.

The foregoing method and device are particularly useful with samples requiring separation of solute from insoluble materials, such as in samples prepared by silicagel chromatography. When the solute is wicked through element 20, the latter apparently serves not only to filter out large silica particles completely, but by some mechanism prevents the remainder of the silica e.g. colloidal particles, from appearing in interfering quantities at end 24, even with wick structures of as short as one inch. Using conventional techniques to transfer the solute to the matrix material often contaminates the latter with silica regardless of how careful the operator may be.

Thus, it will be apparent that the method of the invention provides material in a form directly suitable for use in the pelleting process of the prior art. By doing so, one minimizes transfer losses of sample, avoids the accumulation of contaminants and permits more rapid and convenient preparation of pellets, whereby greater sensitivity in the ultimate absorption spectrum and a spectrum representing a purer sample is obtained.

Since certain changes may be made in the above process and apparatus without departing from the scope of the invention herein involved, it is intended that all matter contained in the above description or shown in the accompanying drawings shall be interpreted in an illustrative and not in a limiting sense.

What is claimed is:

1. In a method of preparing samples from solution for analysis by selective absorption of radiation and comprising the steps of;

contacting a body of said solution with one end of an elongated, substantially rigid, porous mass of a material;

transferring said solution from said one end to the opposite end of said elongated mass by capillarity of the porous structure;

evaporating the solvent of the solution at said opposite end, and, after evaporation of said solvent converting a portion of said porous mass at said opposite end into a substantially imporous mass transparent to said radiation.

2. In a method as defined in claim 1 including the step of initially forming said porous mass by compression from a powdered form of said material.

3. In a method as defined in claim 1 wherein the step of converting comprises;

crushing said portion; and compressing said crushed portion until the latter forms an imporous mass transparent to said radiation.

References Cited

UNITED STATES PATENTS 3,432,655  3/1969  Venghiattis _____ 250—43.5

OTHER REFERENCES

Willard et al.: "Instrumental Methods of Analysis," D. Van Nostrand Co., Inc. (New York), August 1965, pp. 152–155.

RONALD L. WIBERT, Primary Examiner

R. J. WEBSTER, Assistant Examiner

U.S. Cl. X.R.

23—230, 253; 73—425.4; 117—120; 250—43.5; 264—134, 136